United States Patent Office 3,083,151
Patented Mar. 26, 1963

3,083,151
LUBRICATING OIL PROCESS
Hillis O. Folkins, Crystal Lake, Ill., assignor to The Pure Oil Company, Chicago, Ill., a corporation of Ohio
No Drawing. Filed Nov. 12, 1959, Ser. No. 852,212
5 Claims. (Cl. 204—154)

This invention relates to a method for improving mineral lubricating oils, and is more particularly concerned with a process for increasing the viscosity index of petroleum lubricating oils by means of high-energy ionizing radiation.

Various methods have been developed for increasing the viscosity index of petroleum lubricating oils. One method which is widely used commercially is the solvent extraction process in which the base oil is subjected to extraction by means of a selective solvent such as phenol, furfural, sulfur dioxide, and nitrobenzene, in order to extract the aromatic constituents from the oil. By means of such processes, it is possible to increase the viscosity index of mixed-base oils from a level of approximately 60 to approximately 100 V.I. Pennsylvania-base oils can be improved by extraction processes to a viscosity index of a level of approximately 110 to 115. By means of my process, the viscosity index of mixed-base oils which have been solvent extracted to a V.I. level of 100 can be raised to a level of 140 V.I. or higher.

An object of the invention is to improve the viscosity index of hydrocarbon lubricating oils of mineral origin. Another object of the invention is to provide a practical method for utilizing high-energy ionizing radiation for improving the viscosity index of petroleum lubricating oils.

In accordance with my invention, lubricating oil stocks of petroleum origin, which have or have not been refined by well-known techniques, such as sulfuric acid treatment, clay treatment, solvent extraction, caustic soda washing, or any combination thereof, are subjected to irradiation by high-energy ionizing radiation from any suitable radiation source. The ionizing radiation may be in the form of electrons, gamma-rays, neutrons, or a combination thereof. Suitable sources of radiation are nuclear reactors which emit neutrons, and gamma-rays; fission products such as plutonium and cesium which emit gamma- and beta-rays; activated nuclides, such as cobalt 60, which emit gamma- and/or beta-rays; or a Van de Graaff generator, linear accelerator, resonant transformer, capacitron, cascaded rectifier, or Cockroft-Walton machine, which emit electrons, protons, deuterons, alpha-particles and/or positive ions.

Irradiation of the oil may be carried out by any suitable technique, as, for example, by passing the oil in a stream through a tubular reactor made of metal, quartz, or glass material which the radiation can penetrate, or the irradiation may take place in a reaction chamber with the radiation source located within the reaction chamber.

In order for the irradiation to be effective in obtaining a substantial increase in viscosity index, the radiation dosage should be in the range of $1 \times 10^5$ to $1 \times 10^9$ rads, or equivalent neutron dosage. Irradiation of the oil preferably is carried out in an atmosphere which is inert to the oil under the conditions of treatment, such as nitrogen, helium and argon, and the oil undergoing irradiation should be maintained at ambient temperature, preferably not above 150° F. The dosage will vary with the temperature of treatment, higher dosages being used with lower temperature, and vice versa.

After the oil has been subjected to the desired radiation dosage, it is subjected to controlled oxidation with gas containing free oxygen, as, for example, air, oxygen, or a mixture of inert gas, such as nitrogen, and oxygen at a temperature of 150° to 400° F.

The oxidation step is preferably carried out at substantially atmospheric pressure, as, for example, 0–20 p.s.i.g. Oxygen or air is passed through the oil and recirculated at the desired temperature for a period of time sufficient to obtain the desired increase in viscosity index, or until no further improvement occurs. Alternately, the oxidation step may be carried out under superatmospheric pressures of 20–300 p.s.i.g. in continuous fashion, or by batch-contacting of the oil with oxygen or oxygen-containing gases and allowing the reaction to proceed to the desired point, or until no further absorption of oxygen occurs as indicated by no further decrease in pressure. The amount of oxygen absorbed will vary according to the feed stock, the dose of irradiation employed, and the degree of improvement desired. The amount of oxygen absorbed will generally be in the range of 2–25 mols per hundred mols of oil treated.

Upon completion of the oxidation step, the acidic constituents formed in the oil are removed by any suitable method, as, for example, washing with aqueous or alcoholic caustic solution, distillation from caustic soda, contact with adsorbent clay, and decarboxylation in the presence of hydrogen and a hydrogenation catalyst.

Clay contacting may be carried out at temperatures in the range of 300–500° F., substantially atmospheric pressures, and contact times of the oil with the clay of about 1–30 minutes. Generally, an inert gas is employed in the process to prevent further oxidation.

Catalytic decarboxylation in the presence of hydrogen is carried out at elevated temperatures and pressures in the presence of adsorbent clays, bauxite, activated alumina, or hydrogenation catalysts, such as molybdenum oxide on activated alumina or cobalt molybdate on activated alumina. Suitable operating conditions are temperatures in the range of 475–750° F.; pressures of 100–750 p.s.i.g.; LVHSV of 0.5 to 5.0, and hydrogen-to-hydrocarbon mol ratios of 1.0 to 10.0. By this treatment, acid removal is accomplished without further change in the character of the oil.

Instead of irradiating the oil in an inert atmosphere, such as nitrogen or helium, the oil may be irradiated at higher temperatures of the order of 125–300° F. in the presence of a free-oxygen-containing atmosphere, as, for example, a mixture of nitrogen and oxygen, or a mixture of nitrogen and air. When proceeding in this manner, the oxygen content of the atmosphere is limited and should not exceed 10% by volume, and preferably is limited to 0.5 to 5% by volume. When irradiation is conducted in the presence of an oxygen-containing atmosphere, subsequent oxidation of the irradiated oil is unnecessary, but the product should be treated with clay or alkali, or be subjected to catalytic decarboxylation, as above set forth in order to remove acidic components. When irradiating in the presence of limited oxygen concentrations, the irradiation dosage will be within the range of $1 \times 10^5$ to $1 \times 10^8$ rads.

Instead of subjecting the oil to the total radiation dosage in nitrogen prior to oxidation, the oil may be intermittently irradiated and oxidized so that during each cycle of irradiation the oil is subjected to only a portion of the total dosage above set forth with intervening oxidation until no further V.I. improvement occurs. When operating in this intermittent manner, temperatures of the order of 75° to 300° F. may be used during both the irradiation and oxidation stages.

Although the exact mechanism of the reaction involved which gives rise to the increase in viscosity index of the oil is not known, it is possible that the nitrogen or other inert atmosphere permits rearrangement of the molecules of the hydrocarbons in lubricating oils into compounds having superior viscosity index characteristics. If an attempt is made to irradiate oil in the presence of air, or atmospheres containing high concentrations of oxygen, improvement in viscosity index does not occur. Likewise, higher dosages not only are ineffective but impair the lubricating qualities of the oil.

In order to demonstrate the effectiveness of the process hereinabove set forth, a neutral petroleum lubricating oil base stock, having a viscosity of 170 SUS at 100° F. and a viscosity index of 100, was irradiated at room temperature with electrons from an 8 Mev linear accelerator to a dose level of $5 \times 10^8$ rads. This oil was prepared by phenol extraction of a mixed-base distillate which had been subsequently dewaxed by methyl ethyl ketone dewaxing, and finished by clay contacting at elevated temperature. The oil samples were treated with radiation and oxygen under various conditions to determine their effect on the viscosity index of the resulting product. In each case where the oil underwent treatment, it was subsequently contacted with adsorbent clay until the acid number was substantially zero. The following table sets forth the conditions under which the different samples of the same oil were treated and the results obtained.

Table I

| Sample No. | Treatment | | V.I. of Product |
|---|---|---|---|
| | Irradiation | O₂ Treat | |
| 1 | No | No | 100 |
| 2 | No | Yes | 102 |
| 3 | Yes (air) | No | 103 |
| 4 | Yes (air) | Yes | 102 |
| 5 | Yes (N₂) | No | 105 |
| 6 | Yes (N₂) | Yes | 142 |

In the foregoing table, the first two samples were not irradiated, samples 3 and 4 were irradiated in an atmosphere of air, and samples 5 and 6 were irradiated in an atmosphere of nitrogen. Samples 1, 3, and 5 were not subjected to an oxygen treatment. Following irradiation, samples 4 and 6 were subjected to treatment with oxygen, as was the non-irradiated sample 2. The oxygen treatment was carried out at 300° F. in the absence of a catalyst. The method consisted of circulating oxygen at slightly greater than atmospheric pressure through a 30-gram sample of oil until 500 ml. of oxygen had been absorbed in or had reacted with the oil. Oxygen circulation was at the rate of 12 liters per hour.

It will be seen that while samples 2 to 5, inclusive, gave a slight appreciation in viscosity index, the increase in viscosity index of sample 6, which was irradiated in the nitrogen atmosphere, followed by oxidation, was dramatic.

Although best results are obtained when the oil is subjected to oxidation until no further improvement in V.I. occurs, it should be understood that substantial improvement in V.I. can be obtained by subjecting the oil to less stringent oxidation. Ordinarily, oxidation with approximately 1 to 10 mols of oxygen per 100 mols of oil will give good results. If desired, oxidation can be conducted in the presence of a suitable oxidation catalyst, such as copper or lead naphthenate.

Although the samples of oil shown as irradiated in the foregoing table were refined oil samples, the invention is applicable to mineral lubricating oils which have not been refined, or which have only been partially refined. It will be understood that oils treated in accordance with my invention are susceptible to further V.I. enhancement by addition thereto of V.I. improvers such as butylene polymers and polymerized methyl methacrylate.

The embodiments of the invention in which an exclusive property or privilege is claimed are defined as follows:

1. The method of increasing the viscosity index of mineral lubricating oils comprising irradiating said oils with high-energy ionizing radiation in dose amount of $1 \times 10^5$ to $1 \times 10^9$ rads in an inert atmosphere, then contacting the oil with a gas containing free-oxygen in an amount not less than is present in air at a temperature of about 150–400° F. until oxygen in the amount of about 2 to 25 mols of oxygen per mol of oil treated is absorbed, and removing acidic products from said oils.

2. The method in accordance with claim 1 in which the inert atmosphere is nitrogen.

3. The method in accordance with claim 1 in which the oil is irradiated at ambient temperatures up to about 150° F.

4. The method in accordance with claim 1 in which the oil is alternately irradiated and oxidized.

5. The method in accordance with claim 1 in which the acidic products are removed by contact with adsorbent clay.

References Cited in the file of this patent
UNITED STATES PATENTS

| | | |
|---|---|---|
| 1,897,617 | Mekler | Feb. 14, 1933 |
| 2,350,330 | Remy | June 6, 1944 |
| 2,845,388 | Black et al. | July 29, 1958 |
| 2,905,607 | Long et al. | Sept. 22, 1959 |